(12) United States Patent
Streufert et al.

(10) Patent No.: US 12,124,465 B2
(45) Date of Patent: Oct. 22, 2024

(54) SYSTEMS AND METHODS FOR DATABASE INVESTIGATION TOOL

(71) Applicant: Palantir Technologies Inc., Palo Alto, CA (US)

(72) Inventors: Justin Streufert, Frederick, MD (US); Robert Giardina, Falls Church, VA (US); Arseny Bogomolov, Arlington, VA (US); Brandon Marc-Aurele, Arlington, VA (US); Christopher Luck, Arlington, VA (US); Timothy O'Brien, Washington, DC (US); Matthew LeVan, Arlington, VA (US); Nicholas Hall, McLean, VA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/819,035

(22) Filed: Aug. 11, 2022

(65) Prior Publication Data

US 2023/0032882 A1 Feb. 2, 2023

Related U.S. Application Data

(63) Continuation of application No. 14/936,277, filed on Nov. 9, 2015, now abandoned.
(Continued)

(51) Int. Cl.
*G06F 16/248* (2019.01)
*G06F 16/23* (2019.01)
(Continued)

(52) U.S. Cl.
CPC ............ *G06F 16/248* (2019.01); *G06F 16/23* (2019.01); *G06F 16/2452* (2019.01);
(Continued)

(58) Field of Classification Search
CPC ........ G06F 16/248; G06F 16/93; G06F 16/23; G06F 16/2452; G06F 16/24575; G06F 16/9535; G06F 16/9024
See application file for complete search history.

(56) References Cited

U.S. PATENT DOCUMENTS

| 4,881,179 A | 11/1989 | Vincent |
| 5,999,911 A | 12/1999 | Berg et al. |

(Continued)

FOREIGN PATENT DOCUMENTS

| AU | 2014203669 A1 | 1/2015 |
| AU | 2013251186 B2 | 11/2015 |

(Continued)

OTHER PUBLICATIONS

"U.S. Appl. No. 14/108,187, Applicant-Initiated Interview Summary mailed Apr. 17, 2014", 8 pgs.
(Continued)

*Primary Examiner* — Apu M Mofiz
*Assistant Examiner* — Farhad Agharahimi
(74) *Attorney, Agent, or Firm* — Faegre Drinker Biddle & Reath LLP—Palantir

(57) ABSTRACT

Computer-implemented systems and methods are disclosed that query collections of documents. Disclosed embodiments may include receiving, via a user interface, a first search query comprising a text string. Disclosed embodiments may include, responsive to receiving the first search query, initializing a first query object based on the text string. Further, disclosed embodiments may include translating the first query object to match the formatting of a search engine, the translated first query object capable of searching a plurality of collections of documents. Disclosed embodiments may also include receiving aggregated query results from a search engine based on the translated first
(Continued)

query object. Some disclosed embodiments may include reformatting the aggregated query results based on respective configuration files of the collections. Additionally, disclosed embodiments may include rendering a graphical user interface that facilitates user interaction with the reformatted aggregate query results.

17 Claims, 9 Drawing Sheets

Related U.S. Application Data

(60) Provisional application No. 62/214,817, filed on Sep. 4, 2015.

(51) Int. Cl.
*G06F 16/2452* (2019.01)
*G06F 16/2457* (2019.01)
*G06F 16/25* (2019.01)
*G06F 16/901* (2019.01)
*G06F 16/93* (2019.01)
*G06F 16/9535* (2019.01)
*G06F 16/9538* (2019.01)

(52) U.S. Cl.
CPC ........ *G06F 16/24575* (2019.01); *G06F 16/25* (2019.01); *G06F 16/9024* (2019.01); *G06F 16/93* (2019.01); *G06F 16/9535* (2019.01); *G06F 16/9538* (2019.01)

(56) References Cited

U.S. PATENT DOCUMENTS

| | | | |
|---|---|---|---|
| 6,101,479 A | 8/2000 | Shaw | |
| 6,232,971 B1 | 5/2001 | Haynes | |
| 6,233,586 B1 | 5/2001 | Chang | |
| 6,279,018 B1 | 8/2001 | Kudrolli et al. | |
| 6,370,538 B1 | 4/2002 | Lamping et al. | |
| 6,519,592 B1 | 2/2003 | Getchius | |
| 6,642,945 B1 | 11/2003 | Sharpe | |
| 6,665,683 B1 | 12/2003 | Meltzer | |
| 6,704,726 B1 | 3/2004 | Amouroux | |
| 6,850,317 B2 | 2/2005 | Mullins et al. | |
| 6,944,777 B1 | 9/2005 | Belani et al. | |
| 6,967,589 B1 | 11/2005 | Peters | |
| 7,086,028 B1 | 8/2006 | Davis et al. | |
| 7,194,680 B1 | 3/2007 | Roy et al. | |
| 7,213,030 B1 | 5/2007 | Jenkins | |
| 7,441,182 B2 | 10/2008 | Beilinson et al. | |
| 7,441,219 B2 | 10/2008 | Perry et al. | |
| 7,627,812 B2 | 12/2009 | Chamberlain et al. | |
| 7,634,717 B2 | 12/2009 | Chamberlain et al. | |
| 7,716,140 B1 | 5/2010 | Nielsen et al. | |
| 7,739,246 B2 | 6/2010 | Mooney et al. | |
| 7,765,489 B1 | 7/2010 | Shah et al. | |
| 7,770,100 B2 | 8/2010 | Chamberlain et al. | |
| 7,962,848 B2 | 6/2011 | Bertram | |
| 7,966,199 B1 | 6/2011 | Frasher et al. | |
| 8,001,465 B2 | 8/2011 | Kudrolli et al. | |
| 8,001,482 B2 | 8/2011 | Bhattiprolu et al. | |
| 8,010,507 B2 | 8/2011 | Poston et al. | |
| 8,069,162 B1 | 11/2011 | Emigh | |
| 8,191,005 B2 | 5/2012 | Baier et al. | |
| 8,214,490 B1 | 7/2012 | Vos et al. | |
| 8,225,201 B2 | 7/2012 | Michael | |
| 8,312,367 B2 | 11/2012 | Foster | |
| 8,386,377 B1 | 2/2013 | Xiong et al. | |
| 8,392,556 B2 | 3/2013 | Goulet et al. | |
| 8,527,949 B1 | 9/2013 | Pleis et al. | |
| 8,577,868 B1 | 11/2013 | Zamir | |
| 8,620,641 B2 | 12/2013 | Farnsworth et al. | |
| 8,682,696 B1 | 3/2014 | Shanmugam | |
| 8,798,354 B1 | 8/2014 | Bunzel et al. | |
| 8,799,313 B2 | 8/2014 | Satlow | |
| 8,807,948 B2 | 8/2014 | Luo et al. | |
| 8,812,444 B2 | 8/2014 | Garrod et al. | |
| 8,838,538 B1 | 9/2014 | Landau et al. | |
| 8,855,999 B1 | 10/2014 | Elliot | |
| 8,930,874 B2 | 1/2015 | Duff et al. | |
| 8,938,434 B2 | 1/2015 | Jain et al. | |
| 8,938,686 B1 | 1/2015 | Erenrich et al. | |
| 9,129,219 B1 | 9/2015 | Robertson et al. | |
| 9,165,100 B2 | 10/2015 | Begur et al. | |
| 9,230,060 B2 | 1/2016 | Friedlander | |
| 9,286,373 B2 | 3/2016 | Elliot et al. | |
| 9,348,499 B2 | 5/2016 | Aymeloglu et al. | |
| 9,348,851 B2 | 5/2016 | Kim | |
| 9,348,880 B1 | 5/2016 | Kramer et al. | |
| 2001/0021936 A1 | 9/2001 | Bertram | |
| 2002/0087535 A1* | 7/2002 | Kotcheff | G06F 16/338 |
| | | | 707/999.005 |
| 2002/0194058 A1 | 12/2002 | Eldering | |
| 2002/0196229 A1 | 12/2002 | Chen et al. | |
| 2003/0028560 A1 | 2/2003 | Kudrolli et al. | |
| 2003/0036927 A1 | 2/2003 | Bowen | |
| 2003/0061132 A1 | 3/2003 | Mason, Sr. et al. | |
| 2003/0074187 A1 | 4/2003 | Ait-Mokhtar et al. | |
| 2003/0088438 A1 | 5/2003 | Maughan et al. | |
| 2003/0093755 A1 | 5/2003 | O'Carroll | |
| 2003/0171942 A1 | 9/2003 | Gaito | |
| 2004/0078451 A1 | 4/2004 | Dietz et al. | |
| 2004/0236711 A1 | 11/2004 | Nixon et al. | |
| 2005/0015367 A1* | 1/2005 | Cazemier | G06F 16/283 |
| 2005/0028094 A1 | 2/2005 | Allyn | |
| 2005/0080769 A1 | 4/2005 | Gemmell | |
| 2005/0102328 A1 | 5/2005 | Ring et al. | |
| 2005/0125715 A1 | 6/2005 | Di Franco et al. | |
| 2005/0154628 A1 | 7/2005 | Eckart et al. | |
| 2005/0154769 A1 | 7/2005 | Eckart et al. | |
| 2005/0262493 A1 | 11/2005 | Schmidt et al. | |
| 2006/0010126 A1* | 1/2006 | Anick | G06F 16/3325 |
| 2006/0045470 A1 | 3/2006 | Poslinski et al. | |
| 2006/0053097 A1 | 3/2006 | King et al. | |
| 2006/0074866 A1 | 4/2006 | Chamberlain et al. | |
| 2006/0080139 A1 | 4/2006 | Mainzer | |
| 2006/0080283 A1 | 4/2006 | Shipman | |
| 2006/0129746 A1 | 6/2006 | Porter | |
| 2006/0155654 A1 | 7/2006 | Plessis et al. | |
| 2006/0178915 A1 | 8/2006 | Chao | |
| 2006/0178954 A1 | 8/2006 | Thukral et al. | |
| 2006/0206475 A1 | 9/2006 | Naam | |
| 2006/0218491 A1 | 9/2006 | Grossman et al. | |
| 2007/0018986 A1 | 1/2007 | Hauser | |
| 2007/0022125 A1 | 1/2007 | Salam | |
| 2007/0033569 A1 | 2/2007 | Davidson | |
| 2007/0061746 A1 | 3/2007 | Folting | |
| 2007/0106846 A1 | 5/2007 | Bonwick | |
| 2007/0112772 A1 | 5/2007 | Morgan | |
| 2007/0136095 A1 | 6/2007 | Weinstein | |
| 2007/0150801 A1 | 6/2007 | Chidlovskii et al. | |
| 2007/0162454 A1 | 7/2007 | D' Albora et al. | |
| 2007/0168331 A1* | 7/2007 | Reddy | G06F 16/48 |
| 2007/0168871 A1 | 7/2007 | Jenkins | |
| 2007/0174760 A1 | 7/2007 | Chamberlain et al. | |
| 2007/0185850 A1 | 8/2007 | Walters et al. | |
| 2007/0192122 A1 | 8/2007 | Routson et al. | |
| 2008/0059419 A1 | 3/2008 | Auerbach | |
| 2008/0069081 A1 | 3/2008 | Chand et al. | |
| 2008/0103996 A1 | 5/2008 | Forman et al. | |
| 2008/0172607 A1 | 7/2008 | Baer | |
| 2008/0177782 A1 | 7/2008 | Poston et al. | |
| 2008/0186904 A1 | 8/2008 | Koyama et al. | |
| 2008/0208735 A1 | 8/2008 | Balet et al. | |
| 2008/0243711 A1 | 10/2008 | Aymeloglu et al. | |
| 2008/0249820 A1 | 10/2008 | Pathria et al. | |
| 2008/0276167 A1 | 11/2008 | Michael | |
| 2008/0288475 A1 | 11/2008 | Kim et al. | |
| 2008/0301042 A1 | 12/2008 | Patzer | |
| 2008/0313243 A1 | 12/2008 | Poston et al. | |
| 2009/0024962 A1 | 1/2009 | Gotz | |
| 2009/0031401 A1 | 1/2009 | Cudich et al. | |

(56) References Cited

U.S. PATENT DOCUMENTS

| | | |
|---|---|---|
| 2009/0043801 A1 | 2/2009 | LeClair et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106242 A1 | 4/2009 | McGrew et al. |
| 2009/0112678 A1 | 4/2009 | Luzardo |
| 2009/0157732 A1 | 6/2009 | Hao et al. |
| 2009/0164934 A1 | 6/2009 | Bhattiprolu et al. |
| 2009/0177962 A1 | 7/2009 | Gusmorino et al. |
| 2009/0216562 A1 | 8/2009 | Faulkner et al. |
| 2009/0228365 A1 | 9/2009 | Tomchek et al. |
| 2009/0228507 A1 | 9/2009 | Jain et al. |
| 2009/0249178 A1 | 10/2009 | Ambrosino et al. |
| 2009/0281839 A1 | 11/2009 | Lynn et al. |
| 2009/0287470 A1 | 11/2009 | Farnsworth et al. |
| 2009/0319515 A1 | 12/2009 | Minton et al. |
| 2010/0004857 A1 | 1/2010 | Pereira et al. |
| 2010/0030722 A1 | 2/2010 | Goodson et al. |
| 2010/0031141 A1 | 2/2010 | Summers et al. |
| 2010/0070531 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0114831 A1 | 5/2010 | Gilbert et al. |
| 2010/0122152 A1 | 5/2010 | Chamberlain et al. |
| 2010/0169325 A1 | 7/2010 | Dugan |
| 2010/0235915 A1 | 9/2010 | Memon et al. |
| 2010/0238174 A1 | 9/2010 | Haub et al. |
| 2010/0262901 A1 | 10/2010 | DiSalvo |
| 2010/0280851 A1 | 10/2010 | Merkin |
| 2010/0306249 A1 | 12/2010 | Hill |
| 2010/0306722 A1 | 12/2010 | Lehoty et al. |
| 2011/0004626 A1 | 1/2011 | Naeymi-rad et al. |
| 2011/0047540 A1 | 2/2011 | Williams et al. |
| 2011/0074788 A1 | 3/2011 | Regan et al. |
| 2011/0107196 A1 | 5/2011 | Foster |
| 2011/0113062 A1 | 5/2011 | Quinlan |
| 2011/0161409 A1 | 6/2011 | Nair et al. |
| 2011/0179048 A1 | 7/2011 | Satlow |
| 2011/0208565 A1 | 8/2011 | Ross et al. |
| 2011/0225156 A1 | 9/2011 | Pavlik |
| 2011/0225586 A1 | 9/2011 | Bentley et al. |
| 2012/0004894 A1 | 1/2012 | Butler et al. |
| 2012/0065987 A1 | 3/2012 | Farooq et al. |
| 2012/0084184 A1 | 4/2012 | Raleigh et al. |
| 2012/0084287 A1 | 4/2012 | Lakshminarayan et al. |
| 2012/0089606 A1 | 4/2012 | Eshwar et al. |
| 2012/0095980 A1 | 4/2012 | Elyada |
| 2012/0123989 A1 | 5/2012 | Yu et al. |
| 2012/0136804 A1 | 5/2012 | Lucia et al. |
| 2012/0197657 A1 | 8/2012 | Prodanovic |
| 2012/0197660 A1 | 8/2012 | Prodanovich |
| 2012/0215784 A1 | 8/2012 | King et al. |
| 2012/0226523 A1 | 9/2012 | Weiss et al. |
| 2012/0245976 A1 | 9/2012 | Kumar et al. |
| 2012/0266245 A1 | 10/2012 | McDougal et al. |
| 2012/0284670 A1 | 11/2012 | Kashik et al. |
| 2012/0304244 A1 | 11/2012 | Xie et al. |
| 2012/0323829 A1 | 12/2012 | Stokes |
| 2013/0006947 A1 | 1/2013 | Akinyemi et al. |
| 2013/0024440 A1* | 1/2013 | Dimassimo ............. G06F 16/36 707/706 |
| 2013/0055264 A1 | 2/2013 | Burr et al. |
| 2013/0124567 A1 | 2/2013 | Balinsky et al. |
| 2013/0097482 A1 | 4/2013 | Marantz et al. |
| 2013/0151305 A1 | 6/2013 | Akinola et al. |
| 2013/0219456 A1 | 8/2013 | Sharma |
| 2013/0226879 A1 | 8/2013 | Talukder et al. |
| 2013/0246316 A1 | 9/2013 | Zhao et al. |
| 2013/0262527 A1 | 10/2013 | Hunter et al. |
| 2013/0262528 A1 | 10/2013 | Foit |
| 2013/0288719 A1 | 10/2013 | Alonzo |
| 2013/0325826 A1 | 12/2013 | Agarwal et al. |
| 2014/0089339 A1 | 3/2014 | Siddiqui et al. |
| 2014/0095363 A1 | 4/2014 | Caldwell |
| 2014/0156527 A1 | 6/2014 | Grigg et al. |
| 2014/0195515 A1 | 7/2014 | Baker |
| 2014/0208281 A1 | 7/2014 | Ming |
| 2014/0244284 A1 | 8/2014 | Smith |
| 2015/0026622 A1 | 1/2015 | Roaldson |
| 2015/0073929 A1 | 3/2015 | Psota et al. |
| 2015/0089353 A1 | 3/2015 | Folkening |
| 2015/0100907 A1 | 4/2015 | Erenrich et al. |
| 2015/0169499 A1 | 6/2015 | Patel |
| 2015/0169764 A1 | 6/2015 | Gutlapalli et al. |
| 2015/0186483 A1 | 7/2015 | Tappan et al. |
| 2015/0212663 A1 | 7/2015 | Papale et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| EP | 2487610 A2 | 8/2012 |
| EP | 2963595 A1 | 1/2016 |
| EP | 2993595 A1 | 3/2016 |
| EP | 3002691 A1 | 4/2016 |
| EP | 3009943 A1 | 4/2016 |
| EP | 3032441 A2 | 6/2016 |
| EP | 3035214 A1 | 6/2016 |
| WO | WO-01025906 A1 | 4/2001 |
| WO | WO-2005116851 A2 | 12/2005 |
| WO | WO-2007133206 A1 | 11/2007 |
| WO | WO-2010030913 A2 | 3/2010 |
| WO | WO-2012061162 A1 | 5/2012 |

OTHER PUBLICATIONS

"U.S. Appl. No. 14/108,187, First Action Interview mailed Mar. 20, 2014", 7 pgs.

"U.S. Appl. No. 14/135,289, First Action Interview Office Action Summary mailed Jul. 7, 2014", 12 pgs.

"U.S. Appl. No. 14/135,289, First Action Interview Pilot Program Pre-Interview Communication mailed Apr. 16, 2014", 8 pgs.

"U.S. Appl. No. 14/192,767 Corrected Notice of Allowability mailed Apr. 20, 2015", 6 pgs.

"U.S. Appl. No. 14/192,767, First Action Interview Office Action Summary mailed Sep. 24, 2014", 8 pgs.

"U.S. Appl. No. 14/192,767, First Action Interview Pilot Program Pre-Interview Communication mailed May 6, 2014", 23 pgs.

"U.S. Appl. No. 14/196,814, First Action Interview Office Action Summary mailed Aug. 13, 2014", 8 pgs.

"U.S. Appl. No. 14/222,364, Non Final Office Action mailed Dec. 9, 2015", 38 pgs.

"U.S. Appl. No. 14/225,006, Advisory Action mailed Dec. 21, 2015", 4 pgs.

"U.S. Appl. No. 14/225,084, Examiner Interview Summary mailed Jan. 4, 2016", 3 pgs.

"U.S. Appl. No. 14/265,637, First Action Interview Pre-Interview Communication mailed Sep. 26, 2014", 6 pgs.

"U.S. Appl. No. 14/268,964, Non Final Office Action mailed Jul. 11, 2014", 10 pgs.

"U.S. Appl. No. 14/289,596, Final Office Action mailed Aug. 5, 2015", 15 pgs.

"U.S. Appl. No. 14/306,138, Advisory Action mailed Dec. 24, 2015", 4 pgs.

"U.S. Appl. No. 14/306,138, Examiner Interview Summary mailed Dec. 3, 2015", 3 pgs.

"U.S. Appl. No. 14/306,147, Final Office Action mailed Dec. 24, 2015", 22 pgs.

"U.S. Appl. No. 14/323,935, Notice of Allowance mailed Oct. 1, 2015", 8 pgs.

"U.S. Appl. No. 14/332,306, First Action Interview Pre-Interview Communication mailed May 20, 2016", 5 pgs.

"U.S. Appl. No. 14/463,615, Non Final Office Action mailed Dec. 9, 2015", 44 pgs.

(56) References Cited

OTHER PUBLICATIONS

"U.S. Appl. No. 14/473,860, First Action Interview mailed Nov. 4, 2014", 23 pgs.
"U.S. Appl. No. 14/479,160, First Action Interview Pre-Interview Communication mailed Apr. 20, 2016", 7 pgs.
"U.S. Appl. No. 14/526,066, Final Office Action mailed May 6, 2016", 16 pgs.
"U.S. Appl. No. 14/526,066, Non Final Office Action mailed Jan. 21, 2016", 24 pgs.
"U.S. Appl. No. 14/571,098, Final Office Action mailed Feb. 23, 2016", 37 pgs.
"U.S. Appl. No. 14/676,621, Notice of Allowance mailed Feb. 10, 2016", 5 pgs.
"U.S. Appl. No. 14/715,834, Final Office Action mailed Jun. 28, 2016", 13 pgs.
"U.S. Appl. No. 14/715,834, First Action Interview Pre-Interview Communication mailed Feb. 19, 2016", 19 pgs.
"U.S. Appl. No. 14/715,834, First Action Interview Pre-Interview Communication mailed Apr. 13, 2016", 21 pgs.
"U.S. Appl. No. 14/741,256, Restriction Requirement mailed Feb. 9, 2016", 6 pgs.
"U.S. Appl. No. 14/746,671, First Action Interview Pre-Interview Communication mailed Nov. 12, 2015", 19 pgs.
"U.S. Appl. No. 14/746,671, Notice of Allowance mailed Jan. 21, 2016", 7 pgs.
"U.S. Appl. No. 14/800,447, Final Office Action mailed Jun. 6, 2016", 15 pgs.
"U.S. Appl. No. 14/800,447, First Action Interview—Office Action Summary mailed Mar. 3, 2016", 8 pgs.
"U.S. Appl. No. 14/800,447, First Action Interview—Pre-Interview Communication mailed Dec. 10, 2015", 6 pgs.
"U.S. Appl. No. 14/841,338, Non Final Office Action mailed Feb. 18, 2016", 39 pgs.
"U.S. Appl. No. 14/871,465, First Action Interview Pre-Interview Communication mailed Feb. 9, 2016", 32 pgs.
"U.S. Appl. No. 14/871,465, First Action Interview Pre-Interview Communication mailed Apr. 11, 2016", 7 pgs.
"U.S. Appl. No. 14/883,498, First Action Interview Pre-Interview Communication mailed Dec. 24, 2015", 33 pgs.
"U.S. Appl. No. 14/883,498, Non Final Office Action mailed Mar. 17, 2016", 18 pgs.
"U.S. Appl. No. 14/961,481, Notice of Allowance mailed May 2, 2016", 6 pgs.
"U.S. Appl. No. 14/961,481, Pre-Interview Communication mailed Mar. 2, 2016", 12 pgs.
"U.S. Appl. No. 14/975,215, First Action Interview Pre-Interview Communication mailed May 19, 2016", 5 pgs.
"Australian Application Serial No. 2014201506, Office Action Mailed Feb. 27, 2015", 3 pgs.
"Australian Application Serial No. 2014203669, Notice of Acceptance mailed Jan. 21, 2016", 2 pgs.
"European Application Serial No. 15190307.7, Extended Search Report mailed Feb. 19, 2016", 8 pgs.
"European Application Serial No. 09812700.3, Extended European Search Report mailed Apr. 3, 2014", 9 pgs.
"European Application Serial No. 10188239.7, Non Final Office Action mailed Mar. 24, 2016", 6 pgs.

"European Application Serial No. 14158958.0, Communication Pursuant to Article 94(3) EPC mailed Mar. 11, 2016", 5 pgs.
"European Application Serial No. 14158977.0, Communication Pursuant to Article 94(3) EPC mailed Mar. 11, 2016", 5 pgs.
"European Application Serial No. 14158977.0, Extended European Search Report mailed Jun. 10, 2014", 10 pgs.
"European Application Serial No. 14189344.6, Office Action mailed Feb. 29, 2016", 9 pgs.
"European Application Serial No. 14200246.8, Extended European Search Report mailed May 29, 2015", 8 pgs.
"European Application Serial No. 15184764.7, Extended European Search Report mailed Dec. 14, 2015", 8 pgs.
"European Application Serial No. 15188106.7, Extended European Search Report mailed Feb. 3, 2016", 8 pgs.
"European Application Serial No. 15200073.3, Extended European Search Report mailed Mar. 30, 2016", 16 pgs.
"Great Britain Application Serial No. 1411984.6, Office Action mailed Jan. 8, 2016", 8 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report mailed Sep. 18, 2015", W/ English Translation, 9 pgs.
"Netherlands Application Serial No. 2012421, Netherlands Search Report mailed Sep. 18, 2015", 8 pgs.
"Netherlands Application Serial No. 2012438, Search Report mailed Sep. 21, 2015", 8 pgs.
"New Zealand Application Serial No. 622389, Office Action mailed Mar. 20, 2014", 2 pgs.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, Constrained Clustering: Advances in Algorithms, Theory, and Applications 4.1, (2003), 9 pgs.
Conner, Nancy, "Remove a published document or blog post", Google Apps: The Missing Manual: The Missing Manual section—Sharing and Collaborating on Documents, XP-002721325, (2008), 15 pgs.
Ferreira, Lucas De Carvalho, et al., "A Scheme for Analyzing Electronic Payment Systems", (1997), 10 pgs.
Gill, Leicester, et al., "Computerised linking of medical records: methodological guidelines", Journal of Epidemiology and Community Health 1993; 47, (Feb. 1993), 316-319.
Winkler, William E, et al., "Bureau of the Census Statistical Research Division Record Linkage Software and Methods for Merging Administrative Lists", Statistical Research Report Series, No. RR2001/03, (Jul. 23, 2001), 11 pgs.
"European Application Serial No. 16187148.8, Extended European Search Report mailed May 4, 2017", 10 pgs.
Jun-Jang, Jeng, et al., "Java framework for search applications", Applications and the Internet, 2003. Proceedings. 2003 Symposium, (Jan. 27, 2003), 11 pgs.
Plodzien, Jacek, et al., "Visualisation of domain knowledge: methods and techniques", Intelligent Content Management System—www.icons.rodan.pl, (Jul. 31, 2003), 26 pgs.

\* cited by examiner

400

SYSTEMS AND METHODS FOR DATABASE INVESTIGATION TOOL

CROSS-REFERENCE TO RELATED APPLICATIONS

This application is a continuation of U.S. application Ser. No. 14/936,277, filed Nov. 9, 2015, which claims priority to U.S. Provisional Application No. 62/214,817, titled "Systems and Methods for Database Investigation Tool," and filed Sep. 4, 2015, which is incorporated herein by reference.

BACKGROUND

Recent data processing applications utilize increasingly large and complex data sets. So called "big data" processing utilizes extremely large data sets, including over billions of data entries, to facilitate complex trend analysis. For example, big data systems can process large volumes of financial transactions and genomics data to identify business trends and prevent diseases, respectively. Though, while large data sets provide a wealth of information, their bulkiness requires specialized processing.

Existing big data tools focus on automated broad investigation, allowing algorithms to run over an extended period of time to produce high level results. While these time-consuming preset processes may run without user intervention, in order to make changes to the analysis scheme, a user must reset the process, wasting prior incomplete process computations. While some programs permit users to manipulate data with lower level detail, these programs cannot accommodate the amount of documents present in big data applications. Hence, users may make use of only a fraction of the data available.

BRIEF DESCRIPTION OF THE DRAWINGS

Reference will now be made to the accompanying drawings showing example embodiments of the present application, and in which.

DETAILED DESCRIPTION OF EXEMPLARY EMBODIMENTS

Figure 1:
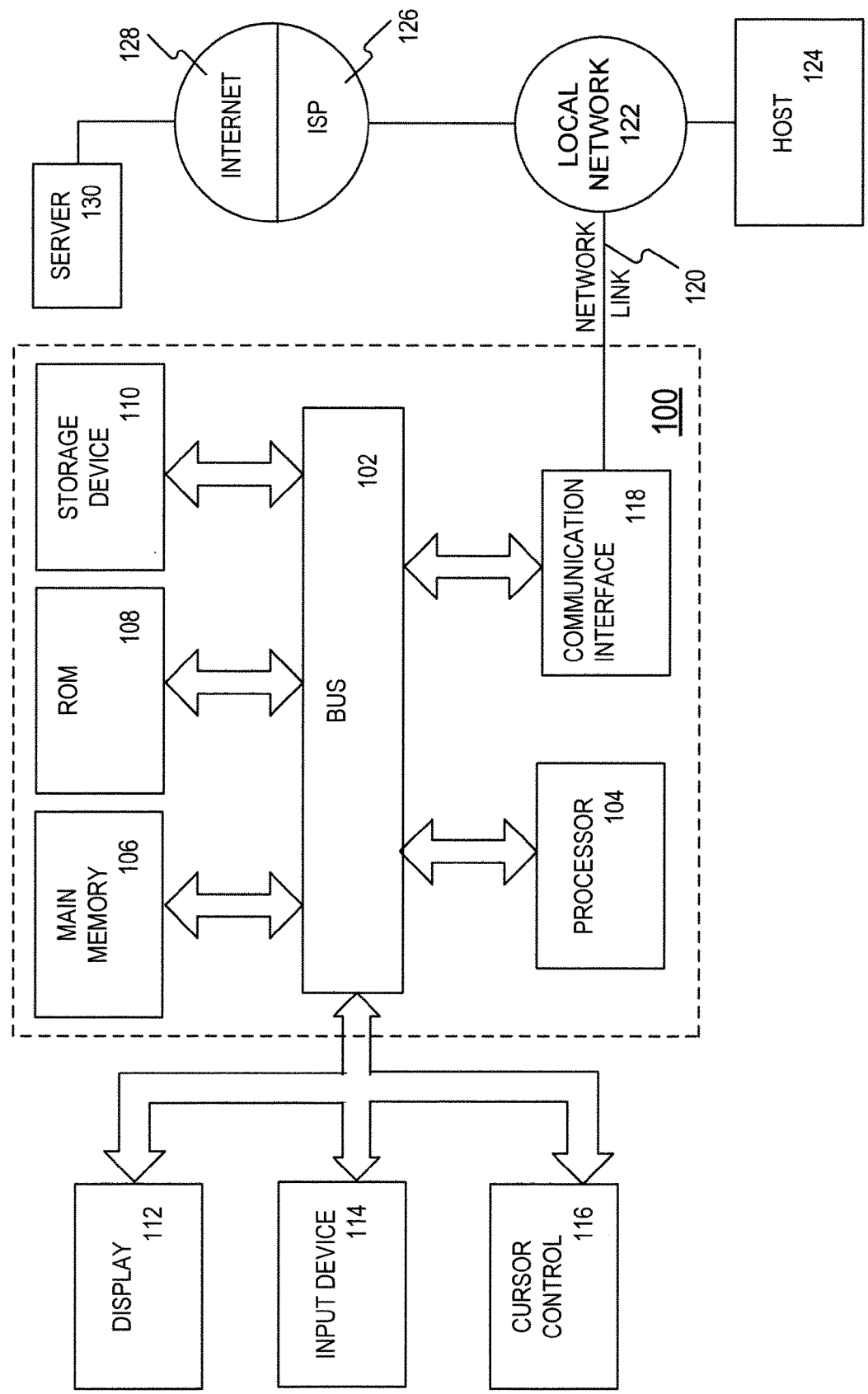
FIG. 1 is a block diagram of an exemplary computer system with which embodiments described herein can be implemented, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Government agencies may receive bulk reports, such as tax returns, suspicious activity reports (SARs), or other types of voluminous reports, which may be used to identify suspicious or unlawful activities. However, given the extremely large volume of reports, investigators may experience difficulty in identifying a reasonable number of meaningful cases to pursue. Identifying trends to recognize more extensive violations may prove to be a challenging task. Disclosed tools organize reports of the same format into collections and permit a user to search across multiple collections simultaneously. Disclosed tools may also present automated visualizations of the search results, such as diagrams and distribution graphs, allowing users to build on existing searches to hone in on notable results of interest. To make use of search findings, disclosed mechanisms may allow users to publish, store and distribute, select results and visuals.

For example, during a query session, a user may enter a name to search. Disclosed tools may return a list of documents from different collections containing the name. Results may be organized by arranging predefined fields of these documents in a spreadsheet grid. A user may select a particular grid cell or column to perform a refined search or generate a graph of results, such as a histogram of returned documents based on their creation date. A user may interact with the graph to refine the search by selecting a column to perform a refined search based on the time period of the histogram column. Disclosed tools may export for search results to share with other users, store results for future use, and/or publish results automatically in a formal report.

Disclosed embodiments may relate to searching extremely large numbers of documents, efficiently analyzing search results, and quickly publishing search findings. For example, an interface may provide tools to build complex queries to search sets of documents and provide visualizations illustrating trends in the results. To maintain a consistent user interface that is compatible with numerous search engines, disclosed embodiments may translate search queries from the user interface and reformat results to follow a specific user interface format. Disclosed embodiments may include export tools to make further use of the search results. For example, export tools may allow a user to share graphs, formal reports, or the search environment with other users.

Disclosed embodiments may be designed to scale for searching extremely large numbers of documents. When millions of documents need to be searched, a database may not provide sufficient resources to timely search all documents. A traditional database may also require excessive storage space to store and index the necessary fields of the documents. Accordingly, disclosed embodiments may use a search engine to index all fields of the millions of documents. Embodiments of the present may organize, access, and manipulate documents structured into collections. As an exemplary illustration, a collection may include millions of documents of similar formats. The values of the documents may be stored and indexed as individual fields. The index of a field may link to the location of the corresponding value in a document. Using this structure, disclosed embodiments may apply a single user query across multiple collections that are directed to different document formats.

Existing systems may not be able to accommodate the large numbers of documents that are searched by disclosed embodiments. Further, such systems may not include an interface capable of building complex queries independent of the back end system, or tools to automatically create visualizations and reports based on search results. Disclosed embodiments may have additional benefits not explicitly recited in this disclosure.

Embodiments of the present disclosure further provide a query building interface allowing the user to navigate through collections that include very large data sets. Via the interface, a user can query, order, and view documents from collections. The interface may receive and apply further search criteria to query results, such as receiving a user selection of a graph, plot, or other visual representation of an initial data set. The interface further facilitates a user's navigation through a large collection of documents by linking directly to the document associated with a query result. The interface may also flag documents resulting from a specific query.

Disclosed embodiments may facilitate presenting the results of user queries. The interface may export results, automatically generate reports, and archive query workflows. These output mechanisms facilitate efficient presentation of results in meaningful formats.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

FIG. 1 is a block diagram of an exemplary computer system 100 with which embodiments described herein can be implemented, consistent with embodiments of the present disclosure. Computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or more microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, after being stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 can be coupled via bus 102 to a display 112, such as a cathode ray tube (CRT), a liquid crystal display (LCD), or a touch screen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 100 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the techniques described herein using customized hard-wired logic, one or more ASICs or FPGAs, firmware and/or program logic which in combination with the computer system causes or programs computer system 100 to be a special-purpose machine. According to some embodiments, the operations, functionalities, and techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 110. Volatile media can include dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, can be example forms of transmission media.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118.

The received code can be executed by processor 104 as it is received, and/or stored in storage device 110, or other non-volatile storage for later execution. In some embodiments, server 130 can provide information for being displayed on a display.

Figure 2:
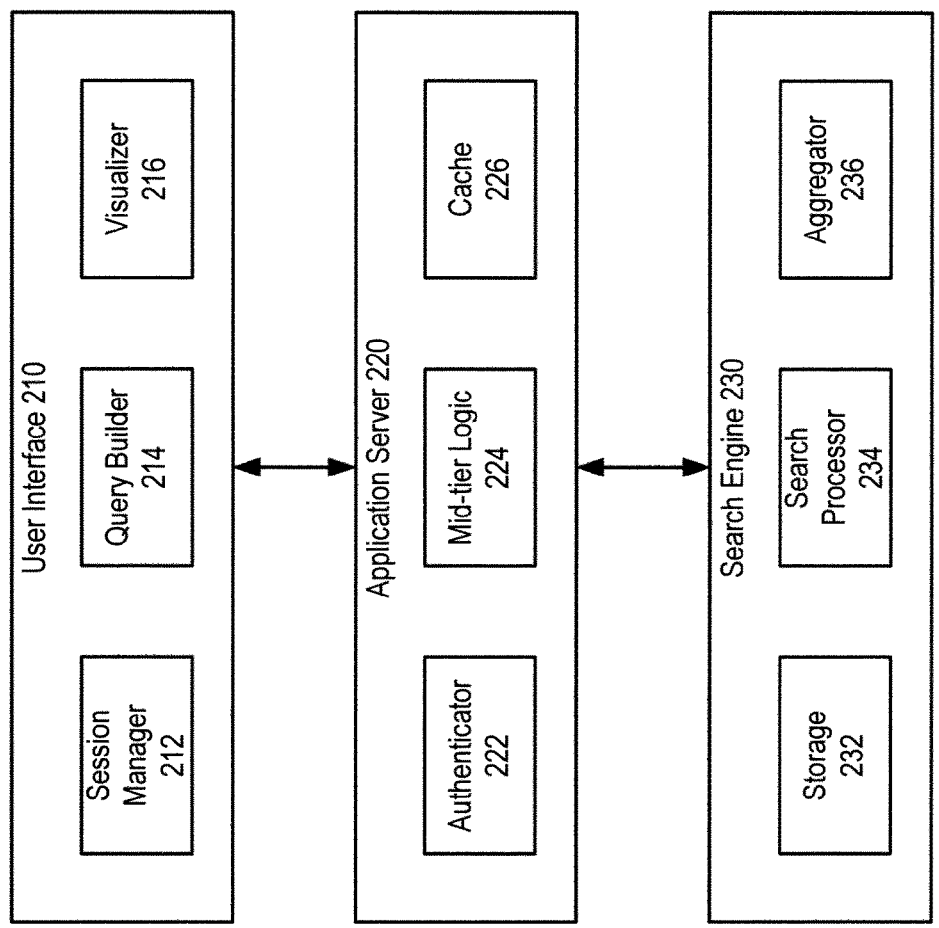
FIG. 2 is a block diagram depicting an exemplary data exploration system, consistent with embodiments of the present disclosure.

FIG. 2 is a block diagram depicting an exemplary data exploration system 200, consistent with embodiments of the present disclosure. Among other things, system 200 facilitates user querying of one or more data sources and display of the query results. System 200 is shown as an arrangement of functional blocks. These functional blocks may be implemented in hardware, software, or a combination of the two. For example, the functional blocks of system 200 may be implemented as special purpose computing devices, such as application specific integrated circuits. In other examples, the functional blocks of system 200 may be implemented as software on specialized hardware.

System 200 may include user interface 210 to receive user input and generate output. User interface 210 may facilitate user interaction with system 200. User interface 210 may receive and process user text entries and graphical selections. For example, user interface 210 may receive signals from input devices, process the signals, and initiate appropriate action based on the input, such as initiating a search, rendering a graphic, or archiving results. Receiving a user-initiated mouse click, for example, may cause user interface 210 to initiate a search query. User interface 210 may also provide output for a user to view. For example, user interface 210 may display graphics, such as search results, on a display device (e.g., a monitor) for the user to view.

In some embodiments, user interface 210 may be a web application, which may run in a generic web browser. For example, user interface 210 may be a CoffeeScript application running on a web browser. In other embodiments, an independently executable program may provide user interface 210.

User interface 210 may include session manager 212 to provide administration during user interactions with system 200. For example, a user may initiate a session on system 200. Based on the session initiation, session manager 212 may set up and maintain a connection between user interface 210 and application server 220, verifying that a search engine 230 is ready to receive queries. To set up the session for a particular user, session manager 212 may load user preferences, retrieve stored results, and tie new session actions to the users account.

In some embodiments, session manager 212 may monitor user interactions with user interface 210. Based on the user action history, session manager 212 may maintain a current state of system 200. Session manager 212 may be able to recall the state of system 200 should the user need to continue working after a break, or should an error cause the session to abruptly crash. For example, session manager 212 may maintain a record of user search queries, flagged documents, and connected databases. Session manager 212 may recall the records after interruptions in the session to recreate the state of system 200 when the user last provided input. For example, a user may enter a series of interrelated queries using user interface 210. A user may provide input to format the results using a particular format, such as forming a bar graph. Due to a malfunction of system 200, user interface 210 may stop running unexpectedly. In this example situation, session manager 212 may recall the prior searches and result formats received from input. Session manager 212 may recreate the state of system 200 prior to the malfunction, which may, for example, advantageously prevent work from being lost.

User interface 210 may include query builder 214 to manage user search queries. Query builder 214 may receive user input and identify it as search query input. In some embodiments, a user may type text into a field of user interface 210. Query builder 214 may identify the text entry of a user as a query command. In some embodiments, user interface 210 may display a visual representation of results. Responsive to a user selection of a region of the visual display, query builder 214 may create a new search query to return a subset of results corresponding to the selection region. For example, user interface 210 may display a histogram based on the creation date of documents resulting from the query "Douglas Hartford." User interface 210 may receive a user selection corresponding to the histogram bar for the year 2009. Responsive to the user selection, query builder 214 may create a new query to retrieve all documents having a creation date in the year 2009 that contain "Douglas Hartford." User selections of other graphics, such as diagrams, trees, tables, and charts may be used by query builder 214 to create similar queries.

Query builder 214 may allow a user to combine queries to filter results. Rather than storing a set of results and filtering the results into a subset, query builder 214 may combine the necessary criteria to obtain the subset into a single search. For example, a user may initially request all documents containing a reference to the entity "Bonny Smith." After viewing the results from the name query, a user may determine that they would further like to refine the results to only show "Bonny Smith" documents from the years 2012 to 2014. To obtain the refined query containing the subset, query builder 214 may combine, based on user input, the query for "Bonny Smith" and the years 2012 to 2014 into a single query, instead of applying the time range query to the actual name query results set.

In another example, a user may want to know if any documents containing "Bonny Smith" from 2012 to 2014 overlap with a set of documents related to transactions by "Clyde Jones" exceeding $10,000. In this example, query builder 214 may generate a new query based on the two queries corresponding to the results sets, rather than aggregating the results entries for each set, comparing them, and generating any overlapping documents. Using a query-based approach may advantageously provide more efficient results because, for example, the query results set from the base searches may not need to be stored or indexed. Instead, a new query may be submitted to readily search the entire collection of indexed documents.

Query builder 214 may generate queries using a standardized format. In some embodiments, a query datatype (e.g., "AbstractQuery") may define the structure used by query builder 214. For example, query builder 214 may initialize an AbstractQuery object that corresponds to given search criteria. Because AbstractQuery may be used to identify a particular set of data, a particular instance of AbstractQuery may represent a specific set of documents. For example, an instance of AbstractQuery may be used as a universal token which is passed between different processes of system 200. Thus, rather than exchanging a list of document numbers or the documents themselves, system 200 may transfer an AbstractQuery instance referencing a collection identifier to identify a particular set of documents.

The AbstractQuery class may define the format for querying various field types (e.g., text, numbers, dates). For example, an AbstractQuery instance may include a tree of Boolean filters to apply, fields to return, set orders, and limits. The class may be extensible to accommodate search field variations of unique data sets. To query documents having unusual data fields (e.g., fields containing Unicode symbols or emoji), query builder 214 may receive and initialize queries using an addendum that extends the AbstractQuery class.

When user interface 210 receives results from queries, user interface 210 may include visualizer 216 to produce graphics illustrating the results. Visualizer 216 may receive query results from application server 220. In some embodiments, visualizer 216 may receive a list of document identifiers, such as unique document index values. The document identifiers may be accompanied by document field values. For example, a document identifier may be sent with entities associated with the document, a location, a timestamp, and a narrative. Other field values may exist to accommodate any data from any document format. The individual fields may be individually indexed.

In some embodiments, visualizer 216 may produce a table of query results for display. Visualizer 216 may organize the results in rows with each column corresponding to a particular field type. For example, a table may include columns for first name, last name, account number, institution, and date for a document. Visualizer 216 may rearrange, organize, and sort the table based on user input. For example, a user may list documents by ascending date of generation.

In some embodiments, visualizer 216 may produce a graph for display. Based on the query results, visualizer 216 may automatically compute values for a chart. Predefined graph formats, such as pie charts, bar charts, histograms, and link diagrams, may allow visualizer 216 to autonomously display relevant graphs.

Visualizer 216 may allow a user to select a column of a table of results. Based on the format of the field of the selected column, visualizer 216 may determine which type of graph to display. For example, for a column that corresponds to a date field, visualizer 216 may generate a histogram illustrating the distribution of the query results over time. The size of the divisions of the histogram may be adjustable and/or predefined by settings. For example, settings may define that the histogram should include only twelve time sections, regardless of the length of the time period of results. User interface 210 may receive input from users to change the formatting of the histogram to meet their needs. In another example, a user may select a column related to a field that is text-based categories, such as institution names. By tallying the number of results for each institution name appearing in the query results, visualizer 216 may automatically generate a pie chart or bar graph of the tallies.

In an embodiment, visualizer 216 may generate a link diagram. The link diagram may include icons for entities (e.g., institutions from which documents originated and persons mentioned in the documents) and documents. Responsive to a user selection of a particular entity, visualizer 216 may display lines corresponding to the documents related to that entity; the documents may, in turn, link to other entities. Thus, visualizer 216 may present a straight forward graphic for determining the path of documents and related parties.

In some embodiments, visualizer 216 may produce a document for display. Responsive to a user selection of a particular field, visualizer 216 may generate a reader view of the document itself. To easily identify the field in the document, visualizer 216 may highlight the selected field. Visualizer 216 may determine the location of the fields in the entire text based on the index values of the fields.

System 200 may include application server 220 to provide network processing resources. Application server 220 may host a variety of support services and act as an interface between user interface 210 and search engine 230.

Application server 220 may include authenticator 222 to manage user identification. To determine the user to which the session belongs, authenticator 222 may receive user identifying information, such as log in credentials (e.g., username and password). Although, more robust security schemes may be used, such as biometric authentication. User authentication may enable application server 220 to retrieve prior session data and restore user workspaces.

Authenticator 222 may facilitate linking with search engine 230. In some embodiments, search engine 230 may require login credentials in order to service queries. Authenticator 222 may provide search engine 230 with the necessary user credentials, such as a user name and password. Authenticating a user at search engine 230 may allow system 200 to track individual user usage of processing resources. Based on a user's usage of search engine 230, system 200 may provide feedback to user to better optimize search strategy. Errant queries, for example, may waste processing resources of search engine 230. By tracking queries per user, system 200 may allow work to be billed on a per query basis.

Application server 220 may include mid-tier logic 224 to translate search queries. Mid-tier logic 224 may receive search queries from user interface 210 and format the queries to send to search engine 230. In some embodiments, mid-tier logic 224 may reformat a query from the search object initialized by query builder 214 and create a new search instruction that may be compatible with search engine 230. For example, query builder 214 may initialize AbstractQuery objects, which are a particular search query variables indicating the search terms. However, in some embodiments, search engine 230 may utilize a search backend, such as an Elasticsearch engine, that may not be able to process AbstractQuery objects. Therefore, Mid-tier logic 224 may process the AbstractQuery object and transform the object into a search request format compatible with the particular search backend. Similarly, in some embodiments, mid-tier logic 224 may translate search results from search engine 230 to send to user interface 210. Mid-tier logic 224 may receive query results in a format native to the particular search backend employed by search engine 230. By reformatting the search results into a format compatible with user interface 210, mid-tier logic 224 may facilitate the efficient production of visuals based on the search results.

In some embodiments, mid-tier logic 224 may support querying multiple collections at once. Mid-tier logic 224 may submit multiple queries to search engine 230 at once and receive multiple results. For example, multiple instances of AbstractQuery may be aggregated and applied to multiple collections of documents having different formats. Mid-tier logic 224 may reformat the multiple queries for various collections into a single query to submit to search engine 230. To support processing of multiple results received from search engine 230 in response to a combined query, mid-tier logic 224 may include processes to compare and separate the search results for the combined query. For example, mid-tier logic 224 may include post-processing functions such as selecting results, joining results, sorting results, and projecting results. Additional functions may be provided to address unique needs of a particular combination of collection formats.

Application server 220 may include cache 226 to store a local copy of search request data. Cache 226 may locally store translated searches and reformatted search results. By maintaining translated versions of frequent or resource intensive searches and results, cache 226 may serve results much more quickly and reduce and reduce the burden on processing resources, such as mid-tier logic 224 and search processor 234.

In some embodiments, cache 226 may include configurable policies. A configuration file may define the amount of data stored by cache 226 and the caching trigger conditions. System 200 may alter the configuration parameters of cache 226 to match the needs of a given collection or search, based on the available resources of application server 220 and search engine 230. For example, when application server 220 processes large results sets, less memory may be free to devote to caching.

System 200 may include search engine 230 to perform searches. Search engine 230 may receive search requests from, and provide results to, application server 220. In some embodiments, search engine 230 may be a server-based enterprise search engine. For example, search engine 230 may be an Elasticsearch search server. However, because mid-tier logic 224 provide translation processes, search engine 230 may utilize different formats without affecting the user experience.

Search engine 230 may include one or more server hardware units. For example, search engine 230 may include one or more hardware processors (e.g., processor 104) connected to memory hardware (e.g., main memory 106, storage device 110). Search engine 230 may include a wired or wireless network interface (e.g., communication interface 118) that connects the hardware processors to a network (e.g., local network 122, Internet 128). Disclosed hardware may be programmed to perform disclosed functions. For example, memory may include instructions for a processor to perform Elasticsearch functions.

Search engine 230 may include storage 232 to maintain data that is subject to searching. Search engine 230 may use separate collections for each document format type. Storage 232 may include a particular data architecture to facilitate searching.

Figure 3:
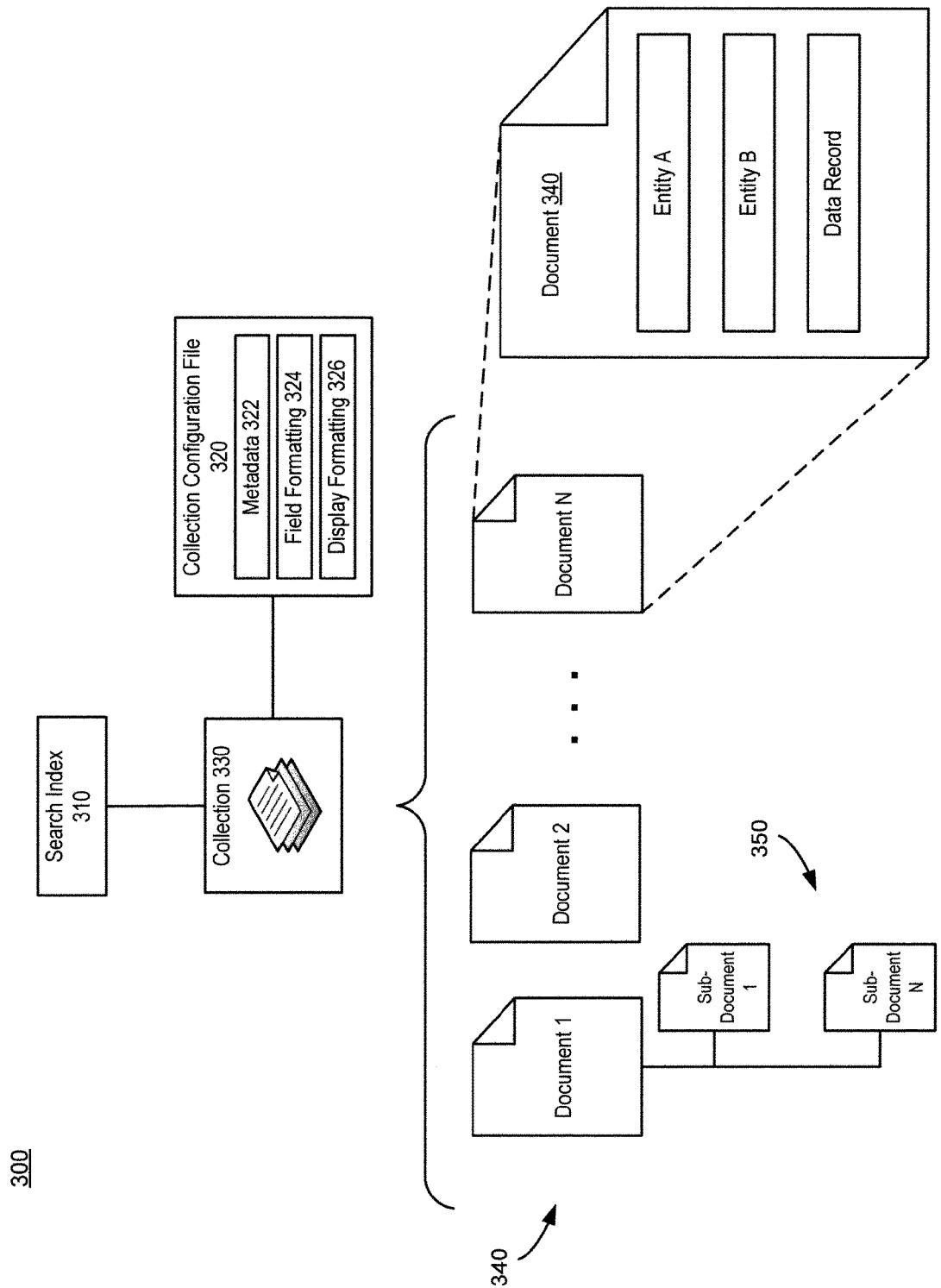
FIG. 3 is a chart illustrating an exemplary data architecture, consistent with embodiments of the present disclosure.

FIG. 3 is a chart illustrating an exemplary data architecture 300, consistent with embodiments of the present disclosure. Data architecture 300 provides a way to organize large volumes of documents into usable records.

Collection 330 may include a large number of documents 340. In some embodiments a collection may include millions of documents 340. Documents 340 of a given collection 330 may all have the same format. For example, documents 340 may have the same fields. As shown, documents 340 may include two entities (e.g., "Entity A" and "Entity B") and a data record. For example, documents 340 could be financial transaction receipts between two parties, where the data record may indicate the details of the transaction (e.g., currency exchanged, date, time, location). Other document collections may include additional fields (not depicted). Example documents may include SARs, tax returns, bank transaction records, etc.

In some embodiments, documents 340 may each include one or more sub-documents 350. Documents 340 may be general records, while sub-documents 350 may be individual reports. For example, documents 340 may be shipping orders, while sub-documents 350 may be individual shipping container logs for the corresponding shipping order. In another example, documents 340 may be monthly user stock transaction account reports with the individual stock trade records for the transactions in the account report may act as sub-documents 350. Additional document and sub-document formats may be used. However, some embodiments may not include sub-documents 350.

Collection 330 may include search index 310 to facilitate information retrieval from collection 330. Search index 310 for every one of documents 340 in collection 330, search index 310 may index each field. For example, search index 310 may index Entity A and Entity B separately. In an embodiment, search index 310 may include a corresponding location of the indexed field within a document. Search index 310 may indicate the line or character range for a particular indexed field. For example, search index 310 may indicate that Entity A (e.g., "John Huckleberry") is displayed on the fifth line of the document. Based on the particular search backend, search index 310 may follow different formats. For example, when search engine 230 is an Elasticsearch search engine, search index 310 may follow a format for use in an Elasticsearch server.

Collection 330 may include collection configuration file 320 to define the type of documents stored in collection 330. Collection 330 may include a plethora of documents that follow the same format. Collection configuration file 320 identifies the common format of the documents in collection 330. For example, when documents 340 correspond to currency transactions, collection configuration file 320 may indicate which fields corresponds to the entities involved in the transaction, the currencies used, and the time toe exchange occurred.

Collection configuration file 320 may include metadata 322 to generally describe collection 330. Metadata 322 may indicate how collection 330 is implemented. For example, metadata 322 may include a version number and a title for collection 330. Metadata 322 may include other information such as a last revision date or the number of documents in the collection.

Collection configuration file 320 may include field formatting 324 to define the field types of formats for the type of documents stored in collection 330. As shown, field formatting 324 may indicate that documents 340 contain three text fields: Entity A, Entity B, and Data Record. For example, field formatting may indicate that Entity A and Entity B are text strings that represent entities, while data record may be a longer text narrative describing the transaction.

Collection configuration file 320 may include display formatting 326 to describe how various fields of documents should be displayed in user interface 210. Display formatting 320 may indicate the style, format, and layout for fields of documents 340. For example, display formatting 326 may indicate that Entity A and Entity B should be displayed in all capital letters. In another example, display formatting 326 may indicate that when an entity corresponds to a person's name, the name should be display as "LAST NAME, FIRST NAME." For dates and times, display formatting 326 may indicate which time zone and notation to use (e.g., Month-Date-Year or Date-Month-Year). Other fields may have additional configuration display format options.

In some embodiments, collection configuration file 320 may include access control data. Collection configuration file 320 may identify parties that are allowed to access the corresponding collection 330. For example, when a collection includes classified documents, collection configuration file 320 may identify the security clearance needed to search and/or view the collection. Search engine 230 may receive user authentication credentials from authenticator 222 to permit searching and viewing of restricted documents.

Returning to FIG. 2, storage 232 of search engine 230 may store collection 330, search index 310, and collection configuration file 320. Storage 232 may provide access to these files for use by search engine 230 in fulfilling search requests.

Search engine 230 may include search processor 234 to process search requests. Search processor 234 may receive and fulfill translated search requests from mid-tier logic 224. Search processor 234 may access search index 310 to apply the Boolean logic of a received search. For example, search processor 234 may search across denormalized indices of multi-valued documents. Search engine 230 may receive search results based on the query.

Search engine 230 may include aggregator 236 to collect search results. As search processor 234 generates results, aggregator 236 may receive and store the generated results. Once the search processing is complete, aggregator 236 may forward the total results to application server 220. For example, aggregator 236 may serve as a local cache of results to provide complete results in a single transmission. Aggregator 236 may apply a format to the documents based on the particular search platform of search engine 230.

The particular functional blocks and arrangement of system 200 may be altered from the depicted configuration based on particular implementation details. In some embodiments, functional blocks may be combined or subdivided based on the available processing resources and hardware. Some functional blocks may be unused or omitted based on the particular application of system 200. For example, based on the given format of the collections that are subject to search, the various functional components described above may be reconfigured to better query the underlying data.

Figure 4:
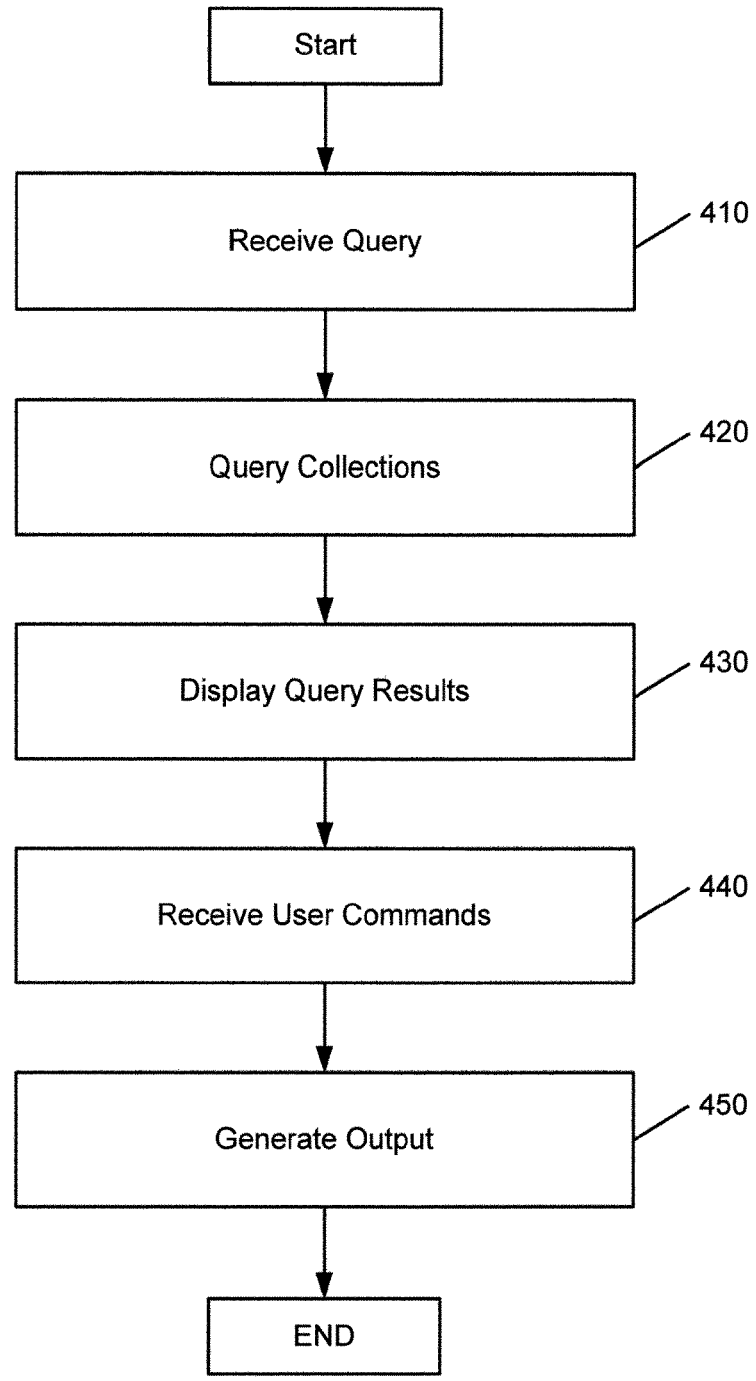
FIG. 4 is a flowchart representing an exemplary method performed by an electronic device for manipulating data, consistent with embodiments of the present disclosure.

FIG. 4 is a flowchart representing an exemplary process 400 performed by an electronic device for manipulating data, consistent with embodiments of the present disclosure. Process 400 is discussed as being performed by system 200. However, other hardware, software, or combinations of the two may be used to perform process 400 consistent with this disclosure.

Process 400 may begin at step 410, where system 200 receives a query from a user. In an embodiment, user interface 210 may receive user input for a search query. For example, a user may enter a text string. Query builder 214 may initiate a query based on the user text input. For example, query builder 214 may initialize an AbstractQuery object corresponding to the query text.

In an embodiment, query builder 214 may generate a query based on a user selection. A user may select a field of a displayed document or graph. For example, a user may selection a bar of a histogram corresponding to the month of March for the year 2013. Query builder 214 may generate a query based on month and year, as well as, the initial query on which the histogram is based. For example, query builder 214 may combine the logic of the sequential selection with the initial query to create a new instance of an AbstractQuery object.

Process 400 may include step 420 to query one or more collections. Query builder 214 may transmit a query to search engine 230 via application server 220. In an embodiment, query builder 214 may transmit an instance of an AbstractQuery object to mid-tier logic 224 for reformatting to be compatible with search engine 230. Once search processor 234 receives the translated search, it processes the request with aggregator 236 storing the ongoing results.

In an embodiment, prior to processing the query, search engine 230 may communicate with authenticator 222 to determine whether the current user of the session has sufficient credentials to perform the search on a particular collection. For example, authenticator 222 may provide a security token or cryptographic key indicating that the search may be performed.

In step 430 of process 400, user interface 210 may display query results. Once search processor 234 completes processing of a particular search, aggregator 236 may provide the search results to mid-tier logic 224, which may translate the search results into a format for user interface 210. User interface 210 may generate a graphical display of the reformatted results. For example, visualizer 216 may generate a grid of results, with fields of resulting documents being arranged in columns.

Process 400 may include step 440 to receive additional user commands. In an embodiment, user input may result in an additional query. As discussed previously, a user may provide input to further filter results of an initial query. Based on user input, after displaying query results (step 430), system 200 may generate an additional query, and process 400 may return to step 410.

In an embodiment, user commands may include commands to generate graphs or reports. A user may indicate that a plot of results over time should be generated. Visualizer 216 may receive user input and reformat results to match user input or predefined formatting criteria.

In step 450, process 400 may generate output based on search results. In an embodiment, visualizer 216 may render a chart. For example, visualizer 216 may calculate histogram values or pie chart values for a specific field of the search result documents. Visualizer 216 may produce other chart types based on configuration settings, such as user configurable graph settings or third party graph plug-ins.

In an embodiment, step 450 may include user interface 210 exporting the search results. User interface 210 may generate a file of raw text data or a common spreadsheet file format (e.g., Excel) to allow the user to use the search results data. In some embodiments, user interface 210 may permit the user to share the data to a workgroup within an organization or user social media. Sharing settings may be controlled by authenticator 222 based on user permission of collection configuration file 320. In some embodiments, system 200 may archive frequently used queries. For example, user interface 210 may store popular AbstractQuery instances. System 200 may facilitate or control the sharing of search results using other export and archive mechanisms consistent with this disclosure.

The steps of process 400 are discussed above in a particular order. However, certain steps may be rearranged or omitted. For example, the displaying of query results (step 430) may not occur until after receiving additional user input (step 440) indicating results display preferences. Other variations and permutations of process steps may be performed consistent with this disclosure.

Figure 5:
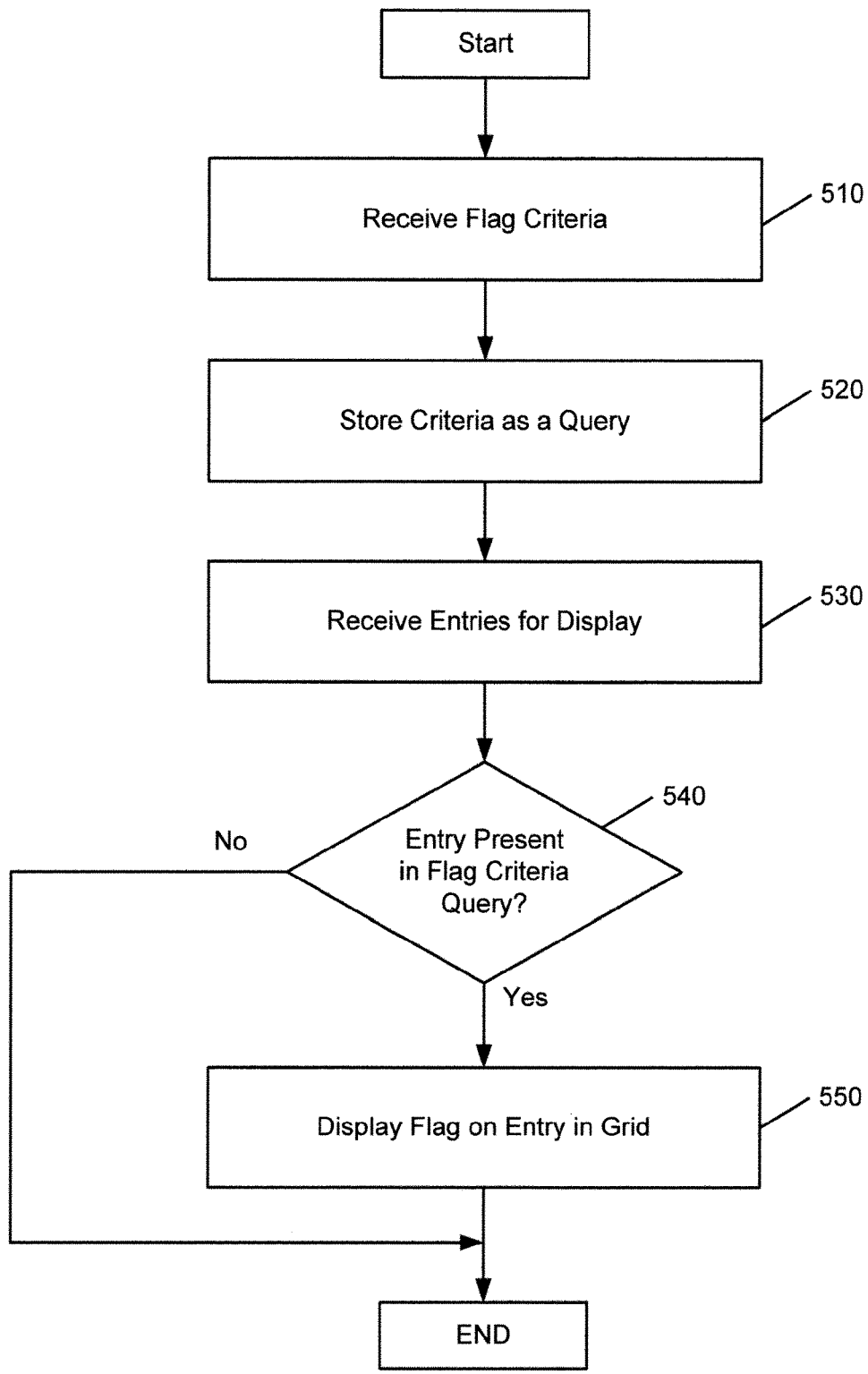
FIG. 5 is a flowchart representing an exemplary method performed by an electronic device for displaying flags, consistent with embodiments of the present disclosure.

FIG. 5 is a flowchart representing an exemplary process 500 performed by an electronic device for displaying flags, consistent with embodiments of the present disclosure. Process 500 is discussed as being performed by system 200. However, other hardware, software, or combinations of the two may be used to perform process 500 consistent with this disclosure.

Process 500 may begin at step 510 to receive flag criteria. User interface 210 may receive user input corresponding to a particular type of document to be flagged. The flag may be based on a particular field value. For example, a user may wish to flag all documents corresponding to transactions originating from Cedar Rapids, Iowa. More complex flag criteria may be processed by user interface 210, such as all transactions between John Huckleberry and Jane Foster over $1,000.

Process 500 may include step 520 where query builder 214 stores flag criteria as a query. Query builder 214 may generate an instance of an AbstractQuery corresponding to the query criteria, similar to the process performed in step 410 of process 400, discussed above.

In step 530 of process 500, user interface 210 may receive query results for display. A user may initiate a query, and system 200 may perform the steps of process 400 to generate the query results. However, prior to displaying the query results (e.g., step 430), when a flag has been created by a user, system 200 may further process the query results by determining if the query results include entries satisfying the flag criteria (step 540).

In some embodiments, step 540 may include determining whether results of the query match the flag query criteria. Rather than modifying the underlying data of result entries to include a flag, query builder 214 may generate a query describing the intersection of the query and flag criteria. When a display result of the query is present in the results of the intersection flag query (e.g., step 540, "Yes"), visualizer 216 may include a flag icon adjacent to the display result. When a displayed document is not present in the intersection flag query results (e.g., step 540, "No"), no flag is displayed.

The steps of process 500 are discussed above in a particular order. However, certain steps may be rearranged or omitted. For example, other query computations may be used to flag results based on this disclosure. Other variations and permutations of process steps may be performed consistent with this disclosure.

FIGS. 6A-6D are screenshots depicting an exemplary interface 600 for manipulating data, consistent with embodiments of the present disclosure. In some embodiments, interface 600 can be provided by an application. The application can include a web browser such as, for example, Google™ Chrome™, Mozilla™ Firefox™ Microsoft™ Internet Explorer™, etc.

Interface 600 may include various display regions, selection regions, and input fields. Query input field 610 of interface 600 may allow a user to provide text input to facilitate query creation by user interface 210. After a query has been performed, collection selection region 620, may list the collections that were queried and the number of results in each collection resulting from the query. As shown, for example, the "Casino DB" collection has 17 entries resulting from the "John Huckleberry" query. Interface 600 may permit a user to select one or more collections to display the individual resulting documents. As shown selected collection 622 corresponds to the "Local Trans" collection.

Cursor 601 may be used to indicate user input. For example, a user may select a particular region of interface 600. Responsive to the selection, interface 600 may initiate action, such as providing user input to system 200 for processing. Hardware such as a mouse or trackpad may control cursor 601. In an alternative embodiment, a touchscreen may be used, in which no cursor is displayed.

In some embodiments, interface 600 may include a tab structure to switch between different data views. As shown, interface 600 may include grid tab selection region 603, graph tab selection region 605, and reader tab selection region 607. These tabs may correspond to specific nested interfaces within interface 600.

Figure 6A:
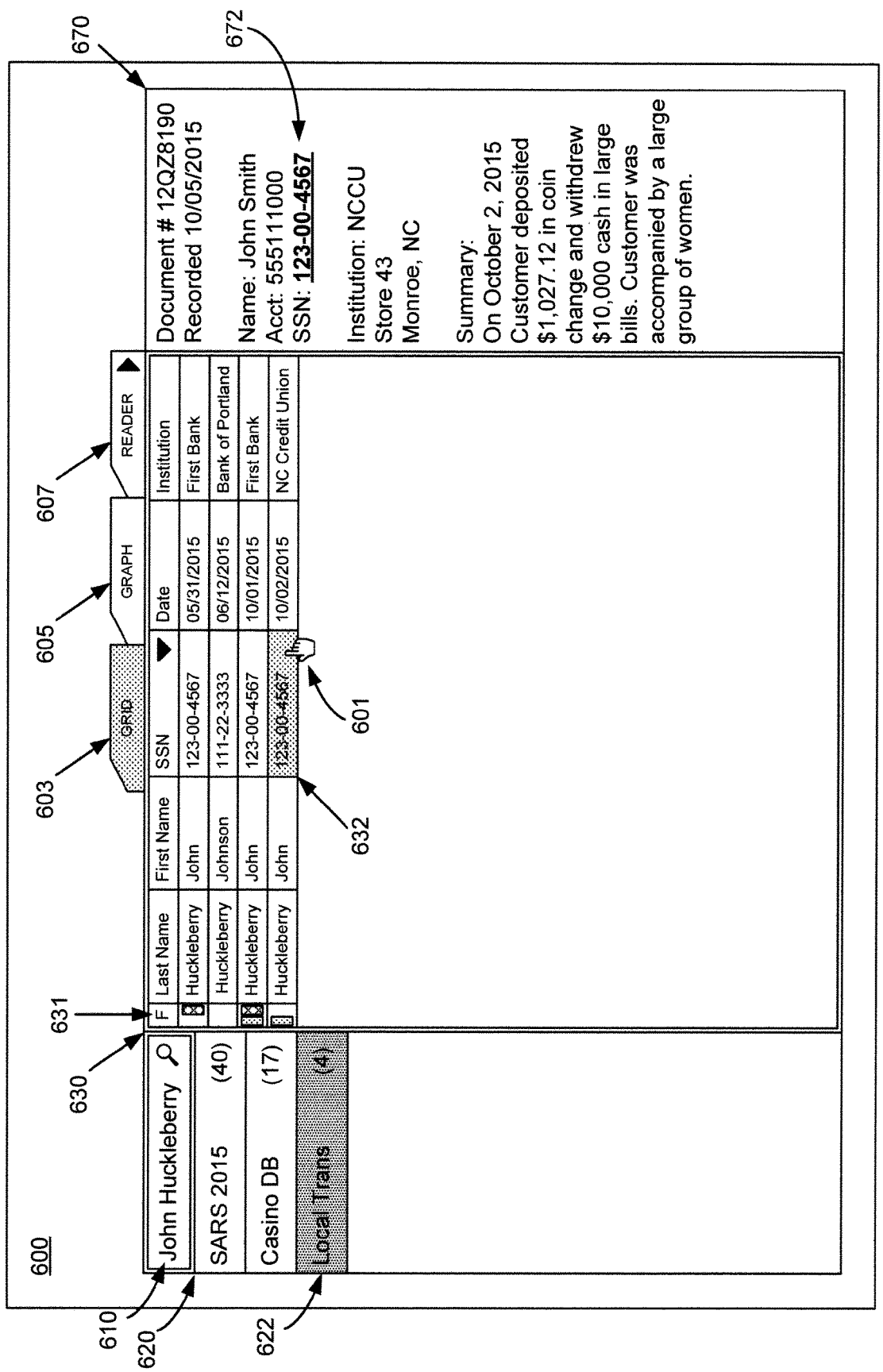
FIGS. 6A-6D are screenshots depicting an exemplary interface for manipulating data, consistent with embodiments of the present disclosure.

As shown in FIG. 6A, interlace 600 may include grid interface 630 when grid tab selection region 603 is selected. Grid interface 630 may include a table of cells. Each row may correspond to a specific document resulting from a search query, while the columns may be coordinated to show the fields of the documents (e.g., based on collection configuration file 320). The columns may be sortable based on the data contained in the corresponding cells from high to low, alphabetically, or based on character values, depending upon the format of the data contained in the field.

In some embodiments, documents may be flagged (e.g., using process 500). As shown in flag column 631, multiple flags may be displayed at once. A user may sort flag column 631 based on the total number of flags on a document or based on particular combinations of flags.

In some embodiments, grid interlace 630 may allow a user to select a given cell to provide additional data. As shown, input from cursor 601 has resulted in selected cell 632 corresponding to the social security number "123-00-4567". Based on the data in selected cell 632, additional searches may be initiated.

In an embodiment, document display region 670 may display the document of a particular grid entry. As shown, document display region 670 includes the document corresponding to selected cell 632. Document display region 670 may also highlight particular text based on user input. For example, interface 600 may underline text to draw users' attention to pertinent information. As shown, highlighted document text 672 corresponds to the data of selected cell 632.

Figure 6B:
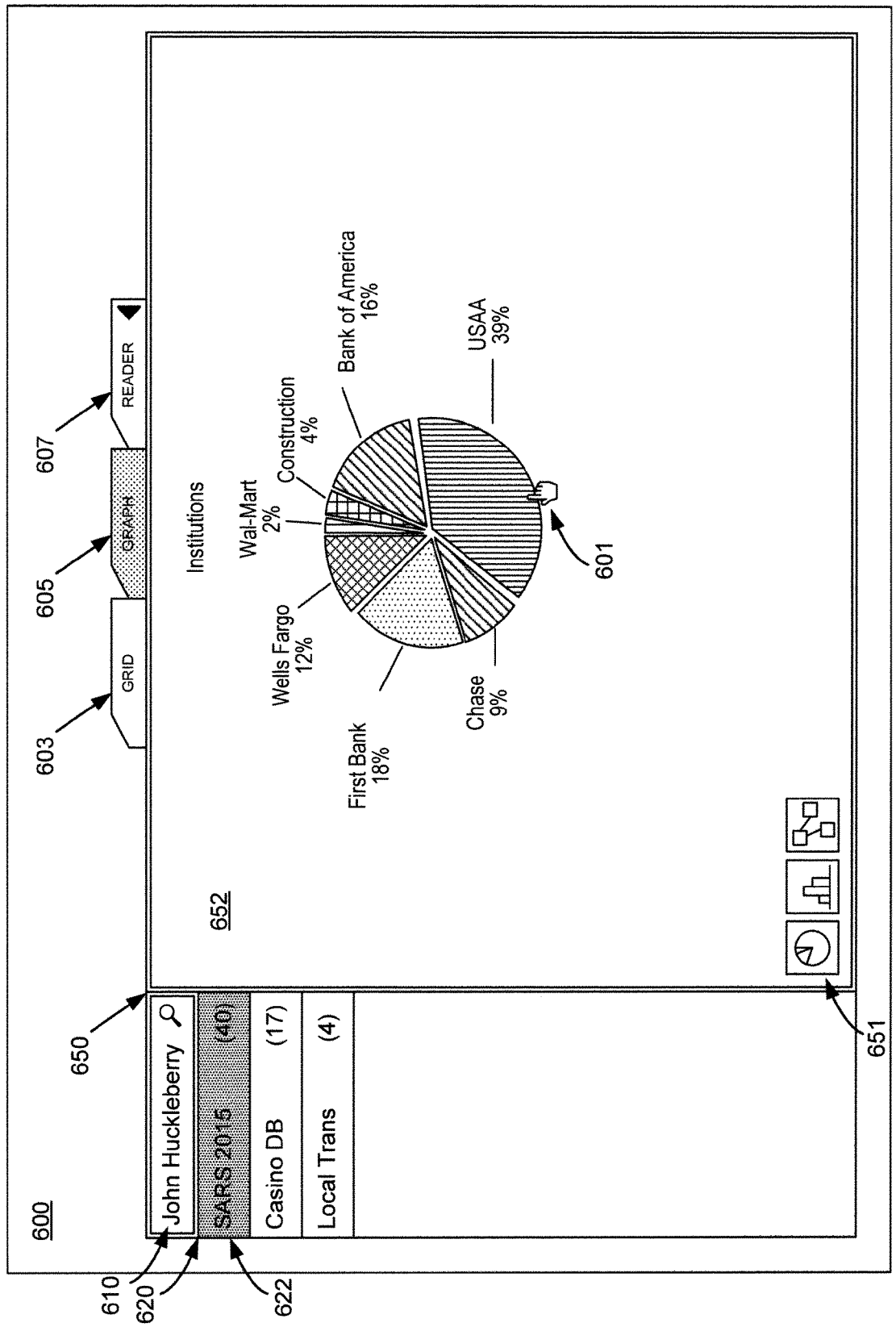

As shown in FIG. 6B, interface 600 may include graph interface region 650. Responsive to receiving user input corresponding to graph tab selection region 605, interface 600 may display various configurable graphs based on search results. For example, graph interface region 650 may include graph configuration selection region 651, which may contain various user input forms to manipulate and customize graphs.

In some embodiments, graph interface region 650 may include pie chart interlace 652. The pie chart may illustrate the percentage breakdown of a particular field of the query results. For example, a user may select a column from grid interface 630, when switching to pie chart interface 652, visualizer 216 of system 200 may generate a chart indicating the distribution of results for the field of the selected column. A user may select a region of the pie chart using cursor 601 to further query results with the criteria of the region. As shown, cursor 601 may select a region of the chart initiating a query for results of "John Huckleberry" having "USAA" as the institution of the document.

Figure 6C:
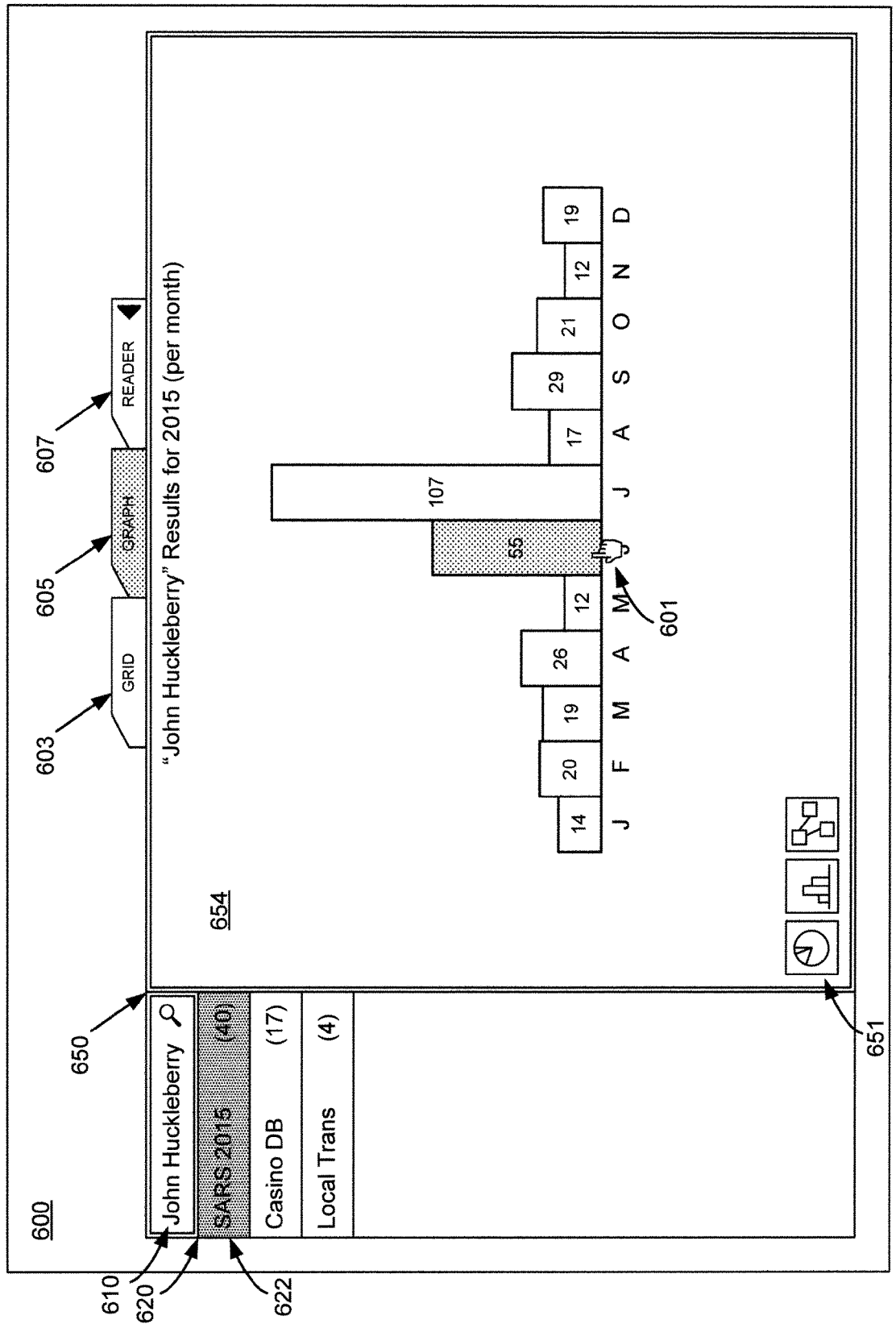

As shown in FIG. 6C, graph interface region 650 may include bar graph interface 654 based on user input in graph configuration selection region 651. As shown, bar graph interface 654 displays a histogram of results for the year 2015. The bars of the histogram may act as additional selection regions to perform narrower searches, displaying results for the corresponding month. Although a histogram is show, bar graphs that display bars based on categories may also be displayed in bar graph interface 654. Additional graph types (not displayed) may also facilitated visual representation of search results.

Figure 6D:
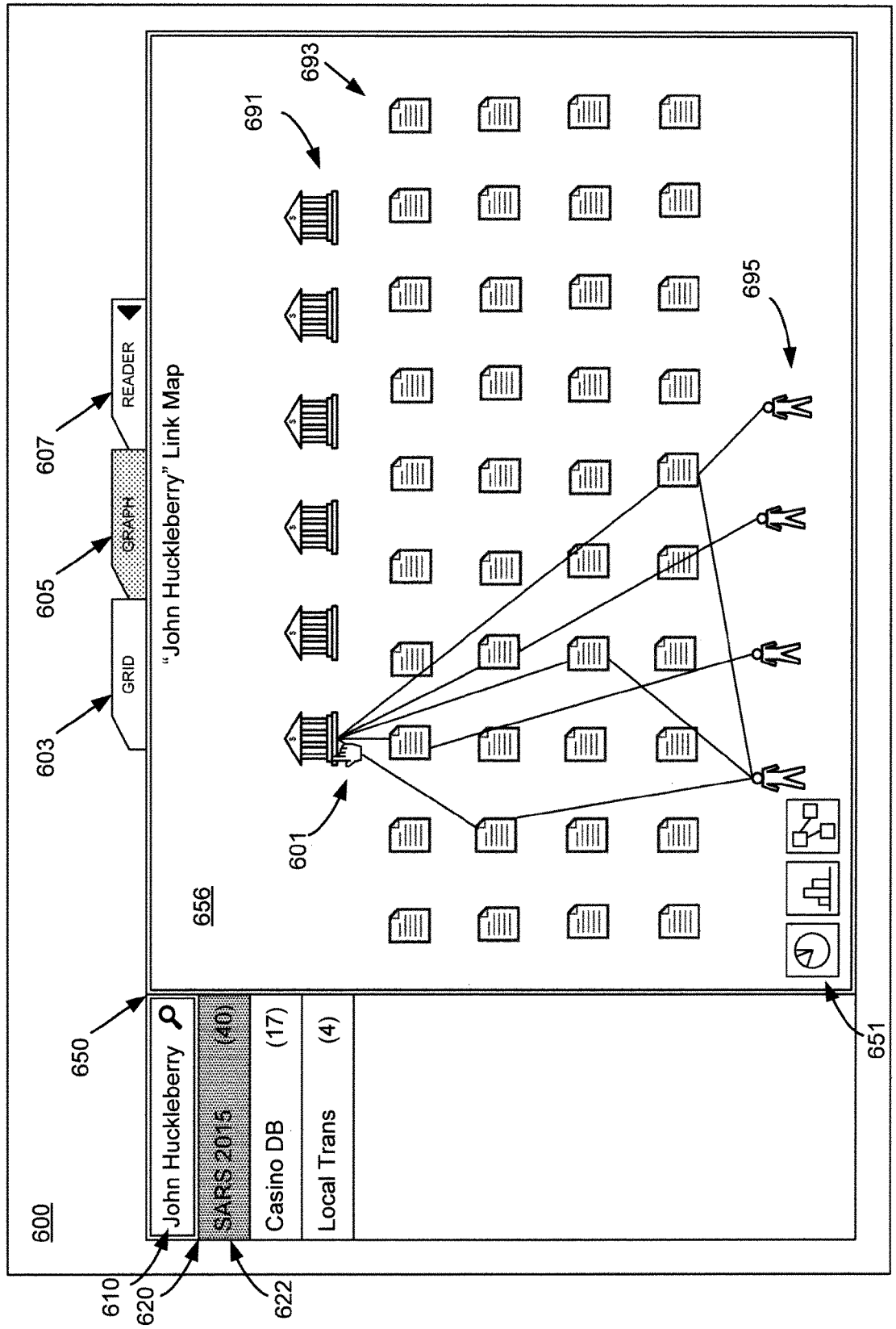

As shown in FIG. 6D, graph interface region 650 may include link map interface 656. Link map interface 656 may illustrate documents 693 resulting from a search, entities 695, and institutions 691 as icons. Responsive to selecting an icon, link map interface 656 may draw lines connecting one of more of institutions 691 or entities 695 to one or more of documents 693, including a reference to them. As shown, cursor 601 selects an institution. Responsive to the selection links are drawn through corresponding documents to their related entities. Based on this visual, a user may easily compare user interactions of documents. Link map interface 656 may rearrange icons to more clearly illustrate links, either automatically or based on user input.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed:

1. A system comprising:
   one or more computer processors;
   one or more computer memories;
   a set of instructions stored in the one or more computer memories, the set of instructions configuring the one or more computer processors to perform operations, the operations comprising:
   receiving a first input, the first input specifying a request to search a collection of documents for documents having a first attribute;
   generating a first query based on the first input;
   applying the first query to the collection of documents;

receiving a first set of results, the first set of results corresponding to the first query;

receiving a second input, the second input specifying a refinement for the first set of results, wherein the first set of results is stored and not indexed;

generating a second query based on the second input, the second query including a data field associated with the second input;

combining the first query and the second query into a refined query different from the first query and the second query; and applying the refined query to the collection of documents to receive a second set of results instead of applying the second query to the first set of results, wherein the second set of results is indexed.

2. The system of claim 1, the operations further comprising producing an interactive visual representation of the first set of results and wherein the receiving of the second input is based on an interaction by a user with the interactive visual representation, the interaction specifying the refinement.

3. The system of claim 1, further comprising:

receiving a third input, the third input specifying a request to search the collection of documents for documents having a second attribute that overlap with the second set of results;

generating a third query based on the refined query and the third input rather than aggregating the second set of results with an additional set of results;

applying the third query to receive a third set of results representing the documents having the second attribute that overlap with the second set of results.

4. The system of claim 1, wherein a set of results corresponding to the second query is not indexed.

5. The system of claim 1, wherein the collection of documents is indexed.

6. The system of claim 1, wherein the first attribute corresponds to a value of a field in each document of the collection of documents, the value of the field being an indexed value.

7. A non-transitory computer readable storage medium storing a set of instructions that, when executed by one or more computer processors, cause the one or more computer processors to perform operations, the operations comprising:

receiving a first input, the first input specifying a request to search a collection of documents for documents having a first attribute;

generating a first query based on the first input;

applying the first query to the collection of documents;

receiving a first set of results, the first set of results corresponding to the first query;

receiving a second input, the second input specifying a refinement for the first set of results, wherein the first set of results is stored and not indexed;

generating a second query based on the second input, the second query including a data field associated with the second input;

combining the first query and the second query into a refined query different from the first query and the second query; and applying the refined query to the collection of documents to receive a second set of results instead of applying the second query to the first set of results, wherein the second set of results is indexed.

8. The non-transitory computer readable storage medium of claim 7, the operations further comprising producing an interactive visual representation of the first set of results and wherein the receiving of the second input is based on an interaction by a user with the interactive visual representation, the interaction specifying the refinement.

9. The non-transitory computer readable storage medium of claim 7, further comprising:

receiving a third input, the third input specifying a request to search the collection of documents for documents having a second attribute that overlap with the second set of results;

generating a third query based on the refined query and the third input rather than aggregating the second set of results with an additional set of results;

applying the third query to receive a third set of results representing the documents having the second attribute that overlap with the second set of results.

10. The non-transitory computer readable storage medium of claim 9, wherein a set of results corresponding to the second query is not indexed.

11. The non-transitory computer readable storage medium of claim 7, wherein the collection of documents is indexed.

12. The non-transitory computer readable storage medium of claim 7, wherein the first attribute corresponds to a value of a field in each document of the collection of documents, the value of the field being an indexed value.

13. A method comprising:

receiving a first input, the first input specifying a request to search a collection of documents for documents having a first attribute;

generating a first query based on the first input;

applying the first query to the collection of documents;

receiving a first set of results, the first set of results corresponding to the first query;

receiving a second input, the second input specifying a refinement for the first set of results, wherein the first set of results is stored and not indexed;

generating a second query based on the second input, the second query including a data field associated with the second input;

combining the first query and the second query into a refined query different from the first query and the second query; and applying the refined query to the collection of documents to receive a second set of results instead of applying the second query to the first set of results, wherein the second set of results is indexed.

14. The method of claim 13, further comprising producing an interactive visual representation of the first set of results and wherein the receiving of the second input is based on an interaction by a user with the interactive visual representation, the interaction specifying the refinement.

15. The method of claim 13, further comprising:

receiving a third input, the third input specifying a request to search the collection of documents for documents having a second attribute that overlap with the second set of results;

generating a third query based on the refined query and the third input rather than aggregating the second set of results with an additional set of results;

applying the third query to receive a third set of results representing the documents having the second attribute that overlap with the second set of results.

16. The method of claim 15, wherein a set of results corresponding to the second query is not indexed.

17. The method of claim 13, wherein the collection of documents is indexed.

* * * * *